Dec. 22, 1936.   T. H. SCHOEPF ET AL   2,065,346
SAFETY APPARATUS FOR RAIL VEHICLES
Filed Feb. 17, 1936   2 Sheets—Sheet 1

INVENTORS
THEODORE H. SCHOEPF,
DAVID M. RITCHIE.
BY
ATTORNEYS

Dec. 22, 1936. T. H. SCHOEPF ET AL 2,065,346
SAFETY APPARATUS FOR RAIL VEHICLES
Filed Feb. 17, 1936  2 Sheets-Sheet 2
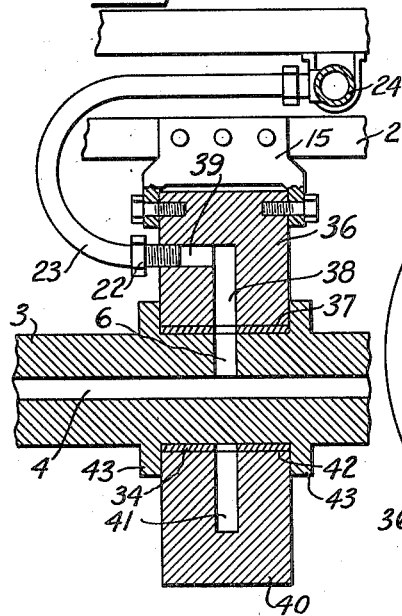
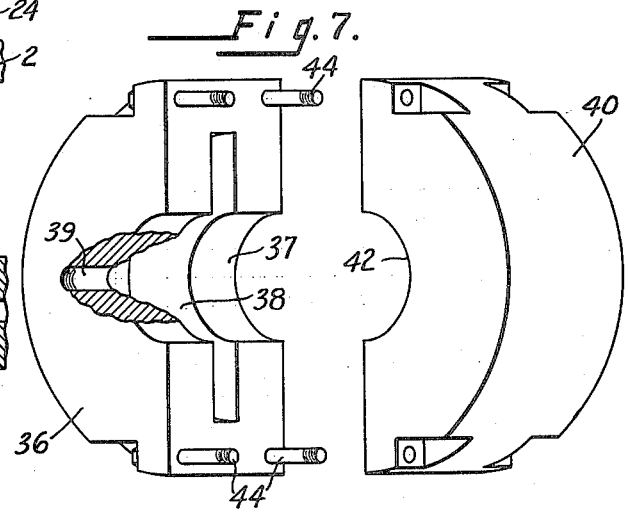
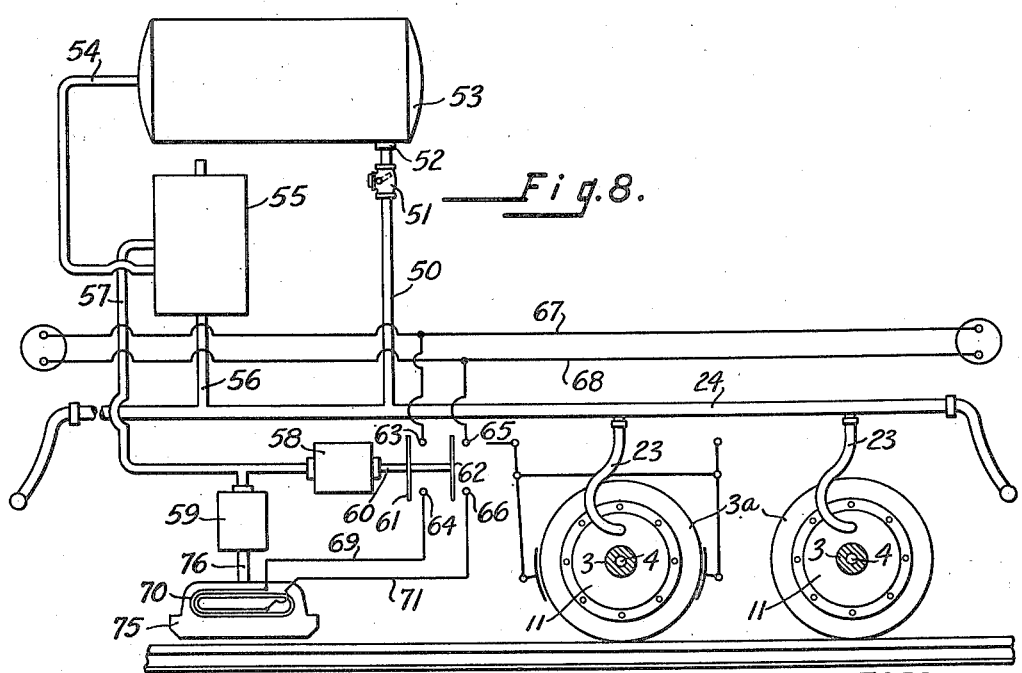
INVENTORS
THEODORE H. SCHOEPF,
DAVID M. RITCHIE.
BY
ATTORNEYS Patented Dec. 22, 1936

2,065,346

UNITED STATES PATENT OFFICE 2,065,346

SAFETY APPARATUS FOR RAIL VEHICLES

Theodore H. Schoepf and David M. Ritchie, Cincinnati, Ohio, assignors to The Cincinnati Traction Building Co., Cincinnati, Ohio, a corporation of Ohio Application February 17, 1936, Serial No. 64,296

6 Claims. (Cl. 246—169)

Our invention relates to safety apparatus and particularly to such apparatus as applied to rail cars.

The particular object of our invention is to provide means whereby, when an axle breaks, the automatic air brakes on a vehicle and the brakes on the entire train, in which the vehicle is coupled as a unit, will be instantly applied.

It is an object of our invention to provide such means which will be inoperative during normal operation of the vehicle and which will be unaffected by normal movement of the axles of the vehicle, but which will be made operative by the breakage or cracking of an axle, in operation.

It is a further object of our invention to provide such means which is actuated by air from the train supply.

It is a further object of our invention to provide such means which, upon fracture or rupture of an axle, will cause escape of air from the air brake train line of the vehicle to which attached, and wherein the decrease in air brake train line pressure due to the escape of air will apply the air brakes to that vehicle as well as any other vehicle in the train which has its air brake train line coupled with the air brake train line, in which the pressure is reduced by operation of our invention.

It is a further object of our invention to provide such means for reducing the air brake train line pressure, whereby to automatically apply electromagnetic track brakes according to the systems disclosed in our copending application Serial No. 64,297, filed February 17, 1936.

In the operation of railway vehicles, the fracture or rupture of an axle is attended by damage to the cargo, rolling stock and permanent way and often by personal injury or loss of life, and necessarily by delay and traffic congestion. We propose to provide and utilize means cooperating with the several axles of a vehicle, which will operate, upon the occurrence of rupture or fracture of the cooperating axle, to automatically and instantaneously apply the air brakes and/or, in some cases, the electromagnetic track brakes of the vehicle.

Referring to the drawings:

Figure 6 is a fragmentary elevational view in section of a modified, simplified form of our invention;

Figure 7 is an exploded isometric view of the body casting shown in Figure 6; and Figure 8 is a diagrammatic view showing the application of the device of our invention to a rail vehicle equipped with automatically operated air brakes and electromagnetic track brakes.

In the preferred embodiment of our invention, each axle is to be provided with an air chamber which, in the normal operation of the vehicle, closes a connecting pipe or conduit which is attached to the air brake train line of a vehicle equipped with mechanism which will instantaneously apply the air brakes to the wheels of the vehicle upon a fall in pressure of the air within the train line. The fracture or rupture of the axle, equipped according to our invention, will release the pressure in the air brake train line and allow air to escape through the connecting pipe or conduit through the fractured portion of the axle, whereby to cause instantaneous application of the air brakes of the vehicle and thus prevent damage to the cargo, passengers or vehicle and congestion of traffic due to the occurrence of serious injury to the vehicle or permanent way, which would necessitate protracted operation of the railway wrecking gangs at or adjacent the point on the permanent way, where the breakage or rupture of the axle occurred.

For the purpose of illustration, we disclose two means for causing the application of the air brakes, wherein we utilize an air chamber in each respective axle of the vehicle to cause instantaneous application of the air brakes to the wheels of the vehicle upon rupture or breakage of the axle and it is to be understood that our invention may be applied to various vehicles having widely varying systems, wherein decreased pressure in the air brake train line will cause automatic application of the air brakes or other brakes as, for instance, the electromagnetic track brakes, such as those disclosed in the above-mentioned copending application, which are hereinafter briefly described and diagrammatically illustrated.

Figure 1:
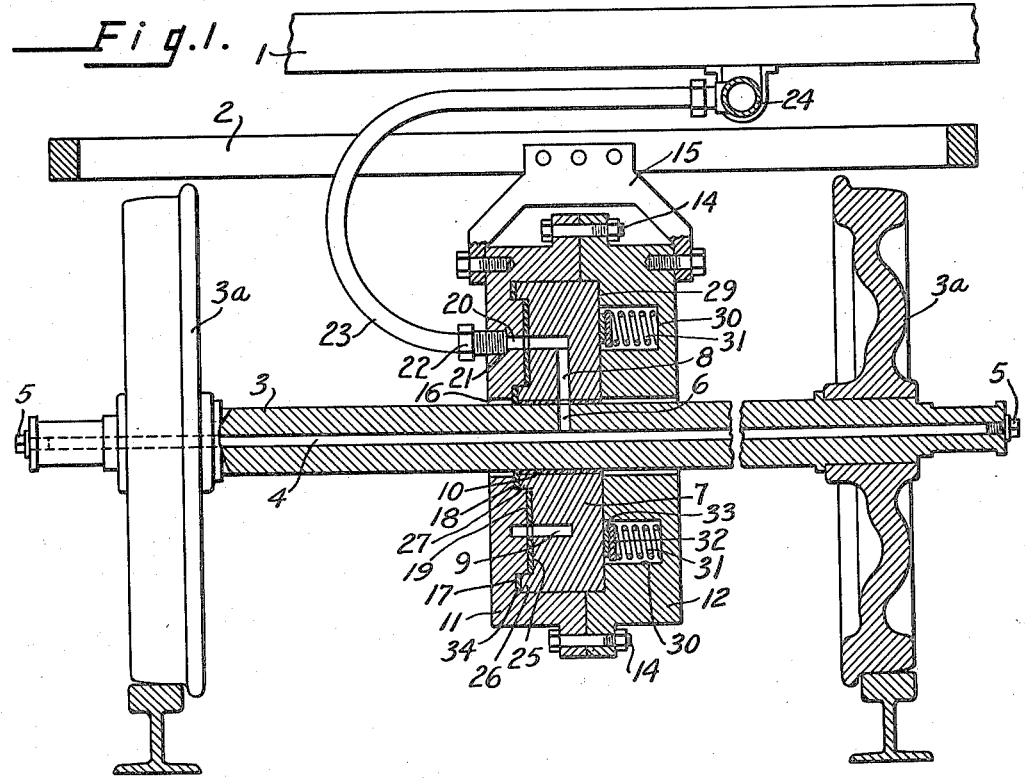
Figure 1 is an elevational view, partly in section, showing our invention applied to the axle of a rail vehicle, parts of the truck and means of attachment between the vehicle truck and body being omitted for the sake of clearness.
Figure 2:
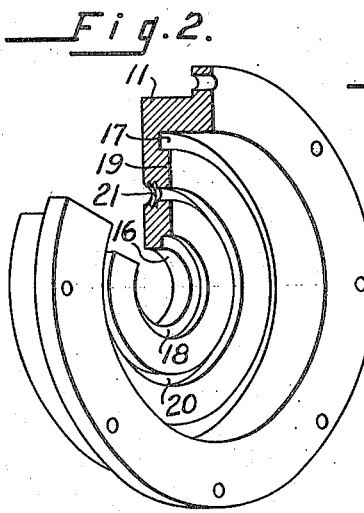
Figure 2 is an isometric view of one of the housing castings disclosed in Figure 1.
Figure 3:
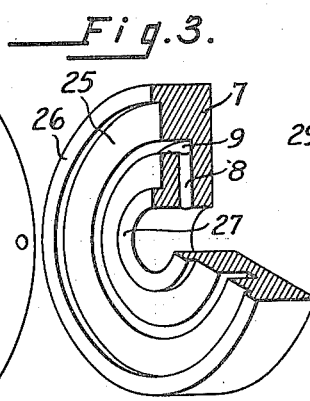
Figure 3 is an isometric view of the annular disk or rotor illustrated in Figure 1.
Figure 4:
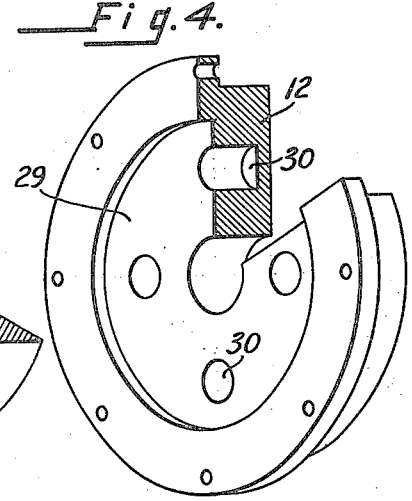
Figure 4 is an isometric view of the second housing casting shown in Figure 1.
Figure 5:
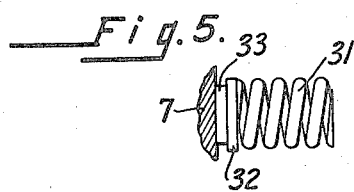
Figure 5 is an elevational view of the spring assembly utilized in the bores of the casting shown in Figure 4.
Figure 5:

Referring to Figures 1 to 5 inclusive of the drawings and particularly to Figure 1, the vehicle body 1 is suitably attached, by means not shown, to a part of the frame 2 of the truck, which is suitably mounted on axles 3 having wheels 3a thereon. Disposed within the axle 3 is the chamber or passageway 4, which extends from end to end within the axle and is closed at either end by plugs 5, suitably threaded into the ends of the axle 3. Disposed between the wheel seats of the axle is the radially disposed circular passage 6, which leads from the periphery of the axle to the chamber 4 therein. Suitably disposed and attached to the axle 3 for rotation therewith is the rotor or disk 7, having therein a radially disposed circular passage 8, which registers with the passage 6 in the axle 3. The outward end of the circular passage 8 communicates with the annular chamber 9. An air seal between the axle 3 and the rotor 7, which may consist of any suitable material, is designated 10. Suitably disposed about the rotor 7 is a housing comprising annular castings 11 and 12, which are suitably secured together by bolts 14 which provide air-tight connection therebetween. The housing comprising castings 11 and 12 is suitably supported by bracket 15, of any desired construction, to a suitable part of the truck frame 2 in such a manner as to so suspend or support the housing comprising castings 11 and 12 that the rotor 7, which is integrally attached to the axle 3, may rotate within the chamber within the housing. The annular casting 11 has a bore 16 therein, which is adapted to closely engage the axle 3, but to permit free rotation of the axle within the bore. The inwardly disposed face of the casting 11 is recessed to accommodate the rotor 7, the main recess comprising a deep annular recess 17 disposed adjacent the outer wall of the main recess and a recess of like depth, 18, disposed adjacent the bore 16.

Between the adjacent walls of the recesses 17 and 18 is an upstanding and inwardly projecting annular shoulder 19, having disposed therein a relatively deep annular chamber 20, which is adapted to communicate with the chamber 9 in the rotor 7. Extending outwardly from the annular chamber 20 is a circular passage 21 having a nipple 22 in communication therewith and threadedly attached to the annular casting 11. A flexible pipe or conduit 23 has one end suitably attached to the nipple 22 and the other end thereof attached to the air brake train line 24, which is suitably mounted on the vehicle body 1. One radial face of the rotor 7, which is adapted to cooperate with the main recess of the housing casting 11, is suitably stepped to provide an annular recess 25, complementary to the annular shoulder 19 and annular shoulders 26 and 27, which are complementary, respectively, to recesses 17 and 18. The annular chamber 9, as stated above, is adapted to communicate with the annular chamber 20. The radial face of the rotor 7, which is opposite the above-described stepped face thereof, is flat or planar. The peripheral face of the rotor is cylindrical.

The housing casting 12 has a recess 29 on the inner face thereof, which is complementary to a portion of the cylindrical periphery and the planar radial face of the rotor 7. The recess 29 has a plurality of chambers 30 therein, which are each adapted to receive a spring 31, having at one end thereof a metal washer 32 having a surface covering 33 of suitable friction material integrally attached thereto. Suitable packing 34 is interposed between the cooperating stepped surfaces of the casting 11 and rotor 7, and the springs 31 are adapted to urge the stepped faces together, whereby to prevent escape of air therebetween. The bracket 15 is preferably provided with resilient connection to the truck frame 2 in order to permit the spring 31 to urge the housing to the right, as seen in Figure 1, so that the cooperating faces of the rotor 7 and housing 11 may be constantly in close abutment.

The train line 24 is suitably connected to mechanism which will operate automatically, upon decrease or fall of pressure in the train line 24, to instantaneously apply the air brake.

*Operation*

In the normal operation, when the axle 3 is intact, the train line 24 is connected by means of the conduit or pipe 23 through the circular passageway 21 into the annular chamber 20, which communicates with the annular chamber 9 in the rotor 7. The annular chamber 9 is connected by the circular passage 8 of the rotor and radially disposed passage 6 of the axle to the chamber 4 of the axle 3. The pressure in the chamber 4 is thus the same as that in the air brake train line 24. Upon fracture of the axle, as indicated in Figure 1, air is allowed to escape from the chamber 4 and thus reduction of the air brake train line pressure will occur through escape of the air through conduit 23, nipple 22, circular passage 21, annular chamber 20, annular chamber 9, circular passage 8, radially disposed passage 6, axle chamber 4 and the fractured portion thereof. The reduction of the pressure in the air brake train line 24 will cause instantaneous and automatic application of the air brakes of the vehicle to the wheels 3a thereof, thus stopping the vehicle and preventing damage to cargo, passengers, vehicle, or permanent way.

*Modification*

In Figures 6 and 7, we have disclosed a modification of our invention, wherein no rotor is utilized, and the housing is composed of two semi-annular castings. The housing comprises the semi-annular casting 36 and another semi-annular casting 40. The casting 36 has a bore 37, which is complementary to the peripheral surface of the axle 3. Disposed within the casting is a chamber 38 formed by an annular recess. Extending from the outer part of the chamber 38 is the circular passage 39, which has in communication therewith and screw-threaded in the casting 36, the nipple 22 to which the flexible conduit or pipe 23 is adapted to be attached. Suitable packing 34 is interposed between the casting 36 and the axle 3. The second casting is designated 40 and has a chamber 41 therein, similar to the chamber 38 of the casting 36 and similarly disposed. The chamber 41 is identical with the chamber 38, save for the fact that it is uninterrupted, the walls thereof being continuous. A suitable packing seal 34 is adapted to be disposed between the bore 42 of the casting 40 and the axle 3. The axle is equipped with a pair of annular flanges 43, which are properly spaced to receive therebetween the respective halves or castings of the housing comprising castings 36 and 40. The axle 3 is equipped with the chamber 4 and radial passage 6 in the same manner as the axle disclosed in Figure 1. The castings 36 and 40 are integrally secured together by means of suitable bolts 44 (Figure 7), to form, in conjunction with the axle 3 rotatably received in the respective bores 37 and 42, an air-tight chamber. The conduit or pipe 23, which is attached to the nipple 22, is adapted to be attached to the air brake train line 24 of the vehicle body, in the same manner as is disclosed in Figure 1.

*Operation*

The operation of the modification of our invention is broadly similar to that form disclosed in Figure 1. The axle 3 rotates within the bores of the castings 36 and 40, air leakage therebetween being prevented by the packing seal 34. The radial passage 6 remains in communication with the chamber formed by the semi-annular chambers 38 and 41. The air pressure of the air brake train line 24 is thus transmitted through conduit or pipe 23, through nipple 22, through passage 39, chambers 38, 41, radial passage 6 into chamber 4 of the axle 3. The axle 3 has means similar to plugs 5 of Figure 1 to close the chamber 4.

In the normal operation, the axle being intact, the pressure in chamber 4 is the same as that in air brake train line 24. Upon the breakage of the axle 3, air will escape through the break and reduce the pressure in the chamber 4 of the axle, which causes a corresponding loss of pressure in the air brake train line 24, as will be obvious. Upon loss of pressure in the train line 24, the air brakes or other brakes, dependent for operation upon pressure drop in train line 24, will be operated. The housing comprising castings 36 and 40 may be suitably attached by bracket 15 to any desired part of the vehicle truck (not shown).

*Safety operation of electromagnetic track brakes*

In Figure 8, we have disclosed diagrammatically the application of our invention to a combined air brake and electromagnetic track brake system, such as is disclosed in our copending application Serial No. 64,297, filed February 17, 1936.

The system disclosed is merely illustrative and it is to be understood that our invention may be applied to any braking system which is dependent, for automatic operation, upon pressure drop in the air brake train line. In the track brake operating system, illustrated in Figure 8, the train line 24 is connected by means of pipe 50, check valve 51 and pipe and nipple 52, to the air reservoir 53. The air reservoir is connected by pipe 54 to the pressure-responsive slide valve 55. The slide valve 55 has the slide thereof operated by a diaphragm and pressure chamber, which pressure chamber is connected by the connector pipe 56 to the air brake train line 24. In the normal position of the valve slide, the end of the pipe 54, which is connected to the slide valve, is closed. Upon reduction of the pressure in the air brake train line 24, the end of the pipe 54 is opened and connected to the air motor line 57. It is to be seen that pressure from the air brake train line 24 travels through the pipe 50, check valve 51, pipe and nipple 52, into reservoir 53, and into pipe 54, but the path of pressure cannot be reversed because of the check valve 51 whereby, upon release of pressure in the air brake train line, pressure in the air reservoir 53 is retained. Suitably attached to the air motor line 57 is a switch operator 58 comprising an air motor. Also suitably attached to the air motor line 57 is a brake positioner 59 comprising an air motor. The switch operator includes a piston 60 having thereon switch blades 61 and 62. The switch blade 61 is adapted, upon operation, to bridge the contacts 63 and 64 and complete the circuit therethrough; while the switch blade 62 is adapted to bridge the contacts 65 and 66 and complete the circuit therethrough. The contact 63 is connected to the wire 67 of an electric train line, while the contact 65 is connected to the other wire 68 thereof.

The electrical train line comprising wires 67 and 68 is suitably connected to any desired source of power. The contact 64 is connected by means of wire 69 to one end of the coil 70 of the brake magnet of track brake 75. The other end of the coil 70 is connected by means of wire 71 to the contact 66. When the switch blade 61 connects contacts 63 and 64, and the switch blade 62 connects the contacts 65 and 66, the path of current to energize the magnets of brake 75 is as follows: from wire 67 to contact 63 through switch blade 61 to contact 64, through wire 69, to coil 70, from coil 70, through wire 71 to contact 66, through switch blade 62 to contact 65, and to wire 68 of the electrical train line.

Upon the completion of this circuit by the operation of switch operator 58, the brake coil 70 energizes the magnets of the track brake 75. The brake-positioner 59 comprises an air motor having a piston rod 76, to which the track brake 75 is attached. The brake positioner 59 and switch operator 58 are connected to a common source of air supply comprising the air motor line 57. When, by a reduction of pressure in train line 24, the slide valve is actuated to connect pipe 54 with air motor line 57, the brake positioner 59 and switch operator 58 are simultaneously operated. The operation of the switch operator 58 closes the circuit for energizing the magnets of the track brake 75, while the simultaneous operation of the brake positioner 59 urges the brake 75 into operative position. It is thus seen that, upon a reduction of pressure in the air brake train line 24, the electromagnetic track brake 75 is automatically energized and positioned for operation.

As shown in Figure 8, the apparatus disclosed in Figure 1 is suitably attached to the axles 3 having wheels 3a thereon. The housings are attached by means of flexible conduits or pipes 23 to the air brake train line 24. Upon breakage of any axle 3, pressure in the train line 24 will be reduced and the electromagnetic track brakes 75 will be instantaneously positioned and energized. It is, of course, understood that we anticipate the use of the modification disclosed in Figures 6 and 7 in the same relation, and that our invention, as above described and hereinafter claimed, is susceptible of use in every braking system, wherein reduction of pressure in the air brake train line or other air reservoir is accompanied by automatic operation of brakes, either air brakes, track brakes or other braking or power-interrupting means. Our invention is particularly adapted for use with the track brake systems disclosed in our copending application Serial No. 64,297, filed February 17, 1936, of which structure a part is disclosed in Figure 8 of the drawings of this application.

It is to be understood that the above description is illustrative and in no wise limiting and that the invention herein described is susceptible of widely varying usage for the accomplishment of various desirable results and that we desire to comprehend within our invention such modifications as may be necessary to adapt it to varying conditions and uses, and which may be embraced within the claims and the scope of our invention.

Having thus fully described our invention, what we claim as new and desire to secure by Letters Patent, is:

1. In a vehicle equipped with power-actuated brakes adapted to be automatically applied upon decrease of air pressure in the air brake train line, means including a pneumatic mechanism cooperating with an axial air chamber extending from end to end in an axle of the vehicle to cause escape of air from the train line through the axial chamber in the axle, upon breakage of the axle, to cause automatic application of the brakes.

2. In an air brake system for a train comprising rail vehicles having a common train line, each of said vehicles having air brakes adapted, upon decrease of pressure in the train line, to be automatically applied; means including a pneumatic mechanism cooperating with an air chamber having its walls defined by a vehicle axle, extending from end to end thereof, and adapted to cause reduction of pressure in the train line, upon breakage of, or development of cracks or fissures in the axle anywhere within its length, to cause automatic application of said air brakes on each of said vehicles.

3. A safety brake applying device for a rail vehicle having an air brake train line, and air brakes adapted to be automatically applied upon decrease of pressure in said train line, comprising a housing having a chamber therein connected to said train line, an axle rotating in said housing, said axle having therein an axial air chamber extending from end to end thereof and a radially disposed passageway leading from said axial chamber to the chamber in said housing whereby, upon breakage of the axle, air pressure in said air train line is released and said air brakes are automatically operated.

4. A safety brake applying device for a rail vehicle having an air brake train line and electromagnetic track brakes adapted to be automatically applied upon decrease of pressure in said train line, comprising a housing having a chamber therein connected to said train line, an axle rotating in said housing, said axle having an axial air chamber and a radially disposed passageway leading from said axial chamber to the chamber in said housing whereby, upon breakage of the axle, air pressure in said air train line is released and said electromagnetic track brakes are automatically operated.

5. A safety brake applying device for a rail vehicle having an air brake train line, and air brakes and electromagnetic track brakes adapted to be automatically applied upon decrease of pressure in said train line, comprising a housing having a chamber therein connected to said train line, an axle rotating in said housing, said axle having an axial co-extensive air chamber therein and a radially disposed passageway leading from said axial air chamber to the chamber in said housing whereby, upon breakage of the axle, or formation of fissures therein, air pressure in said air train line is released and said air brakes and electromagnetic track brakes are simultaneously and automatically operated.

6. A safety brake applying device for a rail vehicle having an air brake train line and air brakes adapted to be automatically applied upon decrease of pressure in said train line, comprising a housing having an annular chamber therein, a bore in said housing, an axle rotatably mounted in said bore, said axle having an axial air chamber therein and a radially disposed passage leading from said air chamber to the periphery of said axle, a rotor rigidly attached to the periphery of said axle and adapted to rotate in the chamber in said housing, said rotor having a radially disposed passage connected at one end to the radially disposed passage in said axle, an annular chamber in said rotor connected to the other end of the passage in said rotor and extending to one side of said rotor, and an annular chamber in said housing connected to said annular chamber in said rotor and to said train line whereby, upon breakage of the axle, air pressure in said air train line is released, and said air brakes are automatically applied.

THEODORE H. SCHOEPF.
DAVID M. RITCHIE.